(12) United States Patent
De Pelsemaeker et al.

(10) Patent No.: US 11,981,182 B2
(45) Date of Patent: May 14, 2024

(54) HEAT CONTROL METHOD FOR A HEAT CONTROL DEVICE, PARTICULARLY FOR A VEHICLE INTERIOR

(71) Applicant: Valeo Systemes Thermiques, Le Mesnil Saint-Denis (FR)

(72) Inventors: Georges De Pelsemaeker, Le Mesnil Saint Denis (FR); Daniel Neveu, Le Mesnil Saint Denis (FR); Lucas Trevalinet, Le Mesnil Saint Denis (FR); Clement Bassignani, Le Mesnil Saint Denis (FR)

(73) Assignee: VALEO SYSTEMES THERMIQUES, Le Mesnil-Saint-Denis (FR)

( * ) Notice: Subject to any disclaimer, the term of this patent is extended or adjusted under 35 U.S.C. 154(b) by 539 days.

(21) Appl. No.: 17/279,366

(22) PCT Filed: Sep. 25, 2019

(86) PCT No.: PCT/FR2019/052263
§ 371 (c)(1),
(2) Date: Mar. 24, 2021

(87) PCT Pub. No.: WO2020/065218
PCT Pub. Date: Apr. 2, 2020

(65) Prior Publication Data
US 2021/0394584 A1 Dec. 23, 2021

(30) Foreign Application Priority Data
Sep. 27, 2018 (FR) ...................................... 1858850

(51) Int. Cl.
*B60H 1/00* (2006.01)
*B60H 1/34* (2006.01)
*B60W 40/08* (2012.01)

(52) U.S. Cl.
CPC ....... *B60H 1/00742* (2013.01); *B60H 1/0075* (2013.01); *B60H 1/00792* (2013.01);
(Continued)

(58) Field of Classification Search
CPC .......................... B60H 1/0071; B60H 1/0075; B60H 1/00742; B60H 1/00792; B60H 1/00807;
(Continued)

(56) References Cited

U.S. PATENT DOCUMENTS

2017/0341485 A1  11/2017  Yoneda et al.
2017/0368907 A1  12/2017  Yoneda et al.
(Continued)

FOREIGN PATENT DOCUMENTS

DE  102013213635 A1 *  1/2015  ......... B60H 1/00742
EP  2258571 A1  12/2010
(Continued)

OTHER PUBLICATIONS

Bader, DE-102013213635-A1 and translation (Year: 2015).*
(Continued)

*Primary Examiner* — Steven S Anderson, II
(74) *Attorney, Agent, or Firm* — Osha Bergman Watanabe & Burton LLP

(57) ABSTRACT

A heat control method for a heat control device, particularly for a vehicle interior, is disclosed. The method involves detecting, delimiting and positioning various parts of the body of an occupant (U), measuring thermal or physiological parameters regarding various parts of the body of the occupant (U) and/or the vehicle interior around the occupant (U), establishing a plurality of thermal comfort indices ($I_n$), each thermal comfort index ($I_n$) corresponding to one of the parts of the body of the occupant (U) taking into account a feeling of warmth or of cold in the associated body part, and of which the absolute value is at a minimum in a comfortable (Continued)

Figure 1:
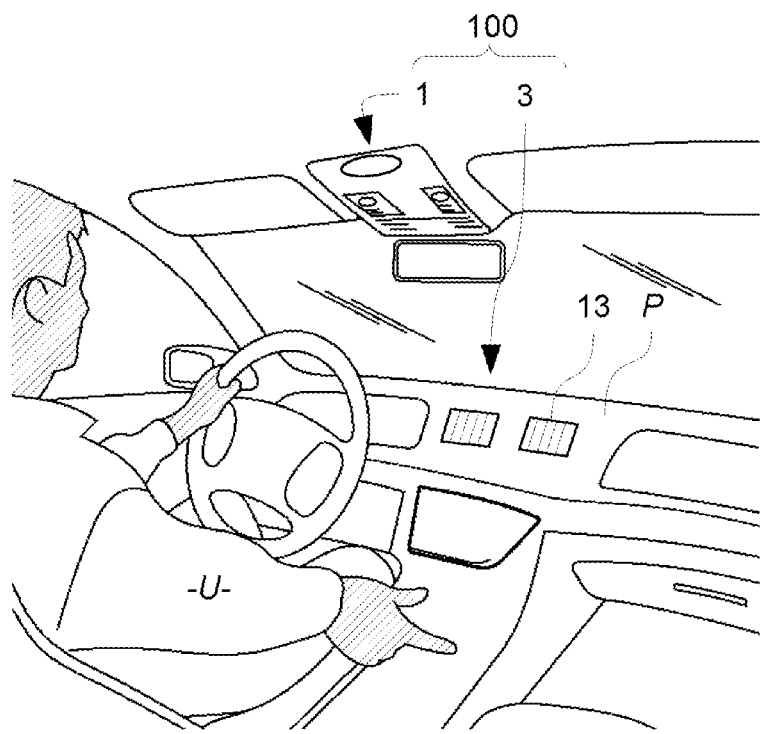

situation, and regulating the operation of a heat control device (3) to minimize a sum of the absolute values of the comfort indices ($\Sigma |I_n|$) in order to create a regulated thermal environment around the occupant (U).

10 Claims, 2 Drawing Sheets

(52) U.S. Cl.
CPC ..... *B60H 1/00807* (2013.01); *B60H 1/00828* (2013.01); *B60H 1/00871* (2013.01); *B60H 1/345* (2013.01); *B60W 2040/0872* (2013.01)

(58) Field of Classification Search
CPC .................. B60H 1/00828; B60H 1/00871; B60H 1/345; B60W 2040/0872
See application file for complete search history.

(56) References Cited

U.S. PATENT DOCUMENTS

2019/0299744 A1* 10/2019 Kusukame ............... F24F 11/72
2019/0322154 A1* 10/2019 Ganguly ............ B60H 1/00742

FOREIGN PATENT DOCUMENTS

| | | |
|---|---|---|
| EP | 3778271 A1 | 2/2021 |
| JP | 2018-4241 A | 1/2018 |
| JP | 2018-62297 A | 4/2018 |
| WO | WO-2017173222 A1 * 10/2017 ........... A61B 5/0075 |

OTHER PUBLICATIONS

European Examining Division for corresponding European Application No. 19 795 270.8, dated Dec. 5, 2022 (6 pages).
Anonymous: "ISO 7730:2005 Ergonomics of the thermal enviornment—Analytical determination and interpretation of thermal comfort using calculation of the PMV and PPD indices and local thermal comfort criteria", ISO Standard, ISO, CH, Nov. 15, 2005 (Nov. 15, 2005), pp. 1-52, XP00956092, Extrait de l'Internet: URL:https://www.iso.org/standard/39155.html (57 pages).
Notification of Reason for Refusal issued in corresponding Japanese Patent Application No. 2021-517388, dated May 31, 2022 (9 pages).
International Search Report and Written Opinion issued in corresponding International Patent Application No. PCT/FR2019/052263, dated Dec. 20, 2019 (9 pages).

* cited by examiner

HEAT CONTROL METHOD FOR A HEAT CONTROL DEVICE, PARTICULARLY FOR A VEHICLE INTERIOR

The present invention relates to a heat control method for a motor vehicle, in order to ventilate the interior of a motor vehicle, particularly in the context of the heat control of said interior.

Conventional heat control modules for vehicles generally comprise an air blower, coupled with a heat control circuit comprising thermal-conditioning elements such as compressors, evaporators, heat exchangers and resistive heating elements. A plurality of vents distributed within the vehicle interior then inject the air set in motion by the blower and cooled by the cold generator at various points in the interior (central console, the feet of the occupants, at roof level, etc.).

These heat control modules emit a flow that the occupants of the vehicle interior direct manually toward their face or toward a specific part of their body.

The heat control is thus uniform, whatever the size, the position, and the build of the occupant. The only possible customization is achieved by orienting the guide vanes of the vents, with or without the opening of a window.

The interior of the vehicle exhibits a high level of thermal inertia, and spaces in which the occupants are not situated also need to be cooled, whereas hotspots such as those parts of the body of the occupant that are exposed to the sun are not specifically cooled. The level of comfort felt is thus reduced.

It is known practice to establish a thermal model of an occupant by using the Fanger thermal model (also referred to as the PMV/PPD model) based on statistical studies of the feeling of comfort, and to regulate the air conditioning power according to thermal or physiological parameters measured by sensors, such as the temperature at various points on the face, the temperature of the vehicle interior, etc., and to control the power of the air conditioning accordingly.

However, the thermal comfort remains only partial, and is not necessarily felt in the same way depending on the state and build of the occupant of the vehicle interior.

In order to at least partially address the aforementioned problem, one subject of the invention is a heat control method for a heat control device, particularly for a motor vehicle interior, comprising the steps of:
  detecting, delimiting and positioning various parts of the body of an occupant,
  measuring thermal or physiological parameters regarding various parts of the body of the occupant and/or the vehicle interior around the occupant,
  establishing a plurality of thermal comfort indices, each thermal comfort index corresponding to one of the parts of the body of the occupant taking into account a feeling of warmth or of cold in the associated body part, and of which the absolute value is at a minimum in a comfortable situation,
  regulating the operation of a heat control device to minimize a sum of the absolute values of the comfort indices in order to create a regulated thermal environment around the occupant.

The heat control method thus allows the feeling of warmth to be optimized dynamically, and allows the distribution of conditioned air over the various parts of the body of the occupant of the vehicle to be optimized.

The method may also have one or more of the following features, taken separately or in combination.

The regulation of the heat device may comprise regulating at least one of the following parameters: temperature, flow rate, orientation, shape of at least one flow of conditioned air emanating from a vent in the vehicle interior.

In the sum of the absolute values of the comfort indices, the comfort index for each body part may be weighted by a morphological weighting coefficient that takes account of at least one of the following parameters: the total surface-area of the body part, the total volume of the body part, the surface-area/volume ratio of the body part, the vessel density of the body part, the nerve density of the body part.

The comfort index for each body part may also be weighted by a contextual weighting coefficient that takes into account at least one of the following parameters: the dynamics of the variation in index over the preceding instants, the separation of the index from its equilibrium value of 0.

The aim of this is to amplify the contribution that one body part makes to the overall feeling of comfort, according to the imbalance or observed local variations which may act in a non-linear manner.

The method may further comprise the steps of:
  isolating those body parts for which the thermal comfort index indicates maximum discomfort,
  regulating the distribution of conditioned air so as to concentrate the flow or flows of conditioned air onto those body parts experiencing the maximum discomfort while reducing the portion of the air flow or flows directed toward the other body parts.

The heat control device may comprise at least one vent of which the orientation over the course of time is controlled so that a flow of air coming from said vent describes oscillations passing in succession over various parts of the body of the occupant and the movement of the vent is slowing around those body parts for which the thermal comfort index has a high absolute value in comparison with the other body parts.

The sum of the thermal comfort indices may also contain an energy weighting term, that is positive and increasing with total power consumed in order to create the regulated thermal environment around the occupant.

The sum of the thermal comfort indices may also contain an acoustic weighting term, that is positive and increasing with the acoustic noise generated in creating the regulated thermal environment around the occupant.

The thermal or physiological parameters for the various parts of the body of the occupant and/or of the vehicle interior may include one or more of the following parameters: a surface temperature of at least one of the parts of the body of the occupant, a temperature of the vehicle interior, the presence or absence of clothing over a part of the body of the occupant, the heat dissipated by a part of the body of the occupant.

The various parts of the body of the occupant that are located and delimited may comprise at least two of the following: the head, the neck and throat, the nape of the neck, the left and right arms, the left and right forearms, the hands, the torso, the abdomen, the left and right thighs, the left and right legs and calves, the feet, the seat, and the back of the occupant. The face may also be broken down into two zones in order better to manage exposure to the sun.

The step of estimating a thermal or physiological parameter may comprise the steps of:
  capturing images of the vehicle interior at the expected positions for the parts of the body of the occupant, using far-infrared cameras, delimiting and positioning, within the captured images, hotspots or coldspots corresponding to parts of the body of the occupant, the step of regulating the thermal-conditioning device comprising a step of concentrating the flow or flows of conditioned air onto the hotspots or coldspots detected.

The method may comprise the steps of:
measuring or estimating the heat produced or supplied by the metabolic activity in the various body parts, and which will be exchanged with the external environment, as well as any heat that might be absorbed from solar radiation, measuring or estimating the level of clothing coverage of the various body parts and the thermal resistance associated with this clothing on each part of the body, estimating the dimensions of the various parts of the body of the occupant, and estimating the surface area for exchange of heat with the environment of each of the parts of the body of the occupant from correlations, tables and from the estimated dimensions, estimating a surface temperature of the various parts of the body of the occupant, by direct measurement or combining the estimates of the heat produced, supplied or absorbed on each part of the body, as well as the level of coverage and the thermal resistance of the associated clothing, measuring or estimating a temperature and speed of the air in the vehicle interior in the vicinity of each body part, measuring or estimating the radiative impact of the surfaces of the vehicle interior facing each body part, calculating the heat flux that can be exchanged at a comfortable temperature on each of the body parts on the basis of the various preceding factors, calculating the thermal comfort indices for the body parts on the basis of the discrepancy between the heat flux that can be exchanged at a reference comfortable temperature on each of said body parts and the heat flux produced, supplied or absorbed on each body part.

Another subject of the invention is the associated heat control system for a motor vehicle interior, comprising:
a heat control device,
at least one camera, capturing images of the motor vehicle interior space in which the body of the occupant is expected,
at least one sensor sensing one or more thermal or physiological parameters of one or more parts of the body of the occupant, relating to a state of thermal comfort of said occupant,
a control unit configured to:
  delimit and position the various parts of the body of the occupant in the vehicle interior from the images captured by the camera,
  establish a plurality of thermal comfort indices, each thermal comfort index corresponding to one of the parts of the body of the occupant taking into account a feeling of warmth or of cold in the associated body part, and of which the absolute value is at a minimum in a comfortable situation,
  regulate the operation of a heat control device to minimize a sum of the absolute values of the comfort indices in order to create a regulated thermal environment around the occupant.

The camera may then be a near-infrared camera, the sensors of thermal or physiological parameters comprising a far-infrared camera.

The heat control device may further comprise:
a blower producing a flow of air of which the flow rate is controlled by the control unit,
a thermal conditioner, conditioning the flow of air produced by the blower to a setpoint temperature controlled by the control unit,
at least one vent, emitting into the vehicle interior a flow of air having an orientation and a shape that are controlled by the control unit.

The device may further comprise a seat-heater device and/or a device for heating the steering wheel of the vehicle, the power of which is controlled by the control unit according to the thermal comfort index for at least one part of the body of the occupant.

Figure 2:
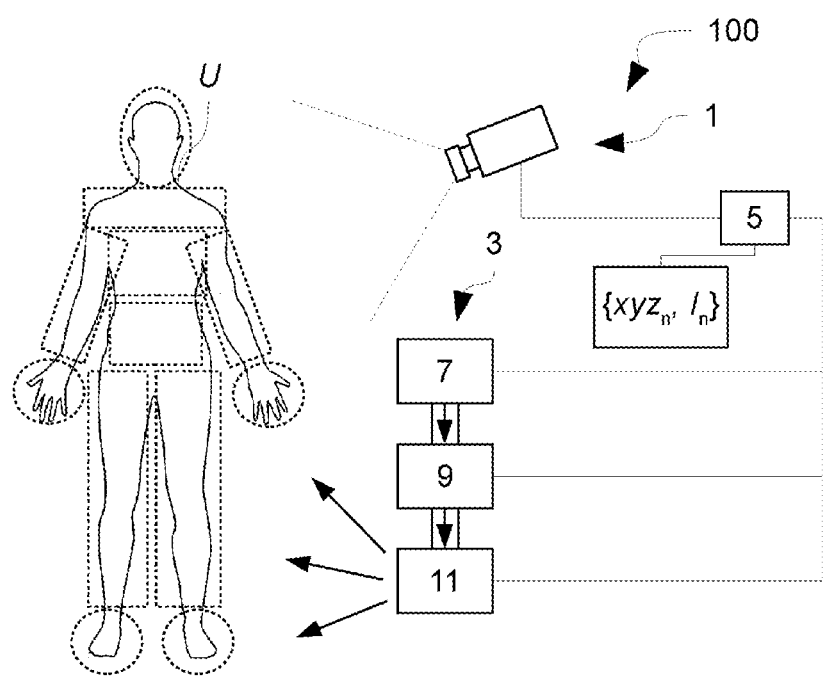
Figure 3:
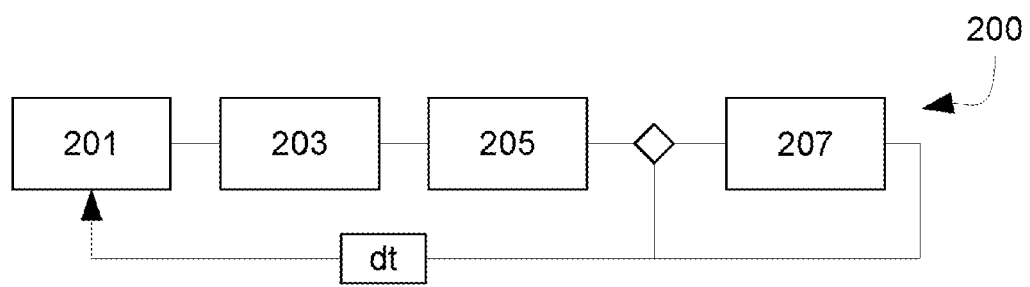
Figure 4:
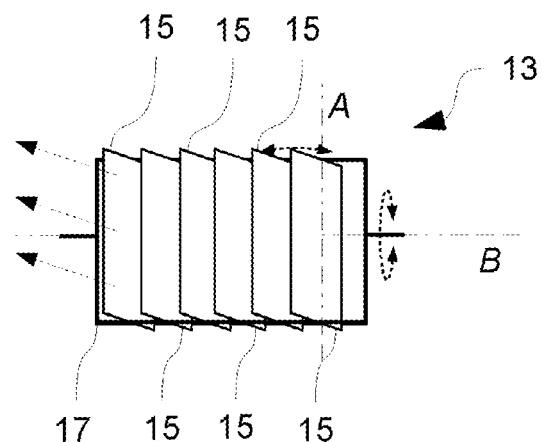

Further features and advantages of the invention will become more clearly apparent upon reading the following description, which is given by way of illustrative and non-limiting example, and the appended drawings, in which:

FIG. 1 schematically shows a vehicle interior with a heat control module,

FIG. 2 schematically shows the heat control system according to one particular embodiment of the invention, FIG. 3 is a flow diagram summarizing the key steps in the method according to the invention, FIG. 4 is a schematic illustration of a vent for a heat control device that can be used for the method according to the invention.

The embodiments described with reference to the figures are examples. Although the description refers to one or more embodiments, this does not necessarily mean that each reference relates to the same embodiment, or that the features apply only to a single embodiment. Single features of various embodiments may also be combined to create other embodiments.

Terms such as "first" and "second" used later on are given simply by way of reference without indicating any particular preference or order of assembly.

A certain number of prepositions such as "above" or "below", etc., are also used in connection with the figures. These prepositions are defined on the basis of the figures, although the ultimate arrangement of the elements with respect to gravity may be different.

FIG. 1 schematically depicts a motor vehicle interior, with an occupant U (in this case in particular the driver) of the vehicle seated in a seat.

A heat control system 100 produces and directs a flow of air toward specific parts of the body of the occupant U of the vehicle, in this instance in particular their head and shoulders.

The heat control system 100 comprises a detection module 1 and a heat control module 3, of which only vents 13 are depicted in FIG. 1, positioned centrally on the dash panel P. These elements are depicted schematically outside of the vehicle interior in FIG. 2.

The vents 13 emit a flow of conditioned air generated by a heat control module 3. Other vents 13 are arranged for example at the lateral ends of the dash panel P, at foot level and at the level of the legs of each occupant U, at vehicle roof level, and on a rear portion of a central column, etc.

The orientation of the vents 13 is notably controlled by the actuation of electric motors.

Document EP 2 258 571 in the name of the Applicant Company describes for example a heat control module 3 provided with an evaporator for generating cold.

The detection module 1 comprises a plurality of sensors 1 directed toward the expected positions of the occupants U of the vehicle, in this instance for example the driver and/or the (front and/or rear) passengers of the vehicle. The detection module collects thermal and physiological parameters relating to various parts of the body of each occupant U. The detection module 1 is, in particular, built into a roof of the motor vehicle interior, at the level of the sunvisors.

The detection module 1 may notably comprise cameras, particularly infrared cameras, which capture images in the infrared domain. The cameras of the detection module 1 are directed in particular toward the expected positions of the occupants of the vehicle: the driver seat, passenger seat, rear bench seat, etc. In particular, one or more very wide-angle cameras (particularly of the "fisheye" type) may cover several positions simultaneously.

These cameras may advantageously comprise near-infrared cameras (NIR cameras with a wavelength of the order of one micrometer), and far-infrared cameras (FIR cameras with a wavelength of the order of ten micrometers or so).

The near-infrared camera is used to capture grayscale images of the vehicle interior. The far-infrared camera is used to estimate the temperature of various portions of the vehicle interior, particularly of the walls of the interior and of the parts of the body of the occupant U.

The images from the far-infrared camera may notably serve to isolate certain parts of the body of the occupant U and/or to detect the presence or absence of a layer of clothing over one or more parts of the body of the occupant.

The images from the near-infrared cameras may in particular serve to delimit the position and dimensions of various parts of the body of an occupant U of the vehicle. Diodes of corresponding wavelength (near-infrared) may in particular illuminate the vehicle interior for the capture of the images.

The images from the far-infrared cameras may in particular serve to identify those parts of the body of the occupant that are exchanging the greatest amount of heat with the vehicle interior, for example in this instance the head and hands, which are hatched in FIG. 1, which are not covered with clothing and therefore show up as hotter.

The sensors 1 of the heat control system 100 may notably encompass other vehicle sensors, such as sensors that sense whether windows or opening panels (doors, sunroof, etc.) of the vehicle are in the open or closed state, pressure sensors on the seats, sensors sensing temperature or heat flux at the level of the seat on which the occupant is sitting, a sensor sensing temperature or heat flux at the level of the steering wheel of the vehicle, perspiration sensors that detect the presence of drops of sweat on at least one of the parts of the body of the occupant, a sensor that senses the breathing rate of the occupant, a sensor that senses the heart rate of the occupant.

In order to estimate a position in space of various parts of the body of the occupant or occupants U, the sensors 1 may notably comprise cameras establishing a stereoscopic image of the occupant or occupants U, emitters of structured light or three-dimensional time-of-flight (3D ToF) cameras, ultrasound emitters/receivers, a lidar or capacitive sensors. Furthermore, the sensors may include thermometers positioned at various points in the vehicle interior, pressure sensors built into the seats (notably used in the context of detecting unrestrained passengers), sensors that sense the position of the seats.

The detection module 1 is notably positioned at vehicle roof level, and may be concealed from view by the occupant U by being covered with a cover that is opaque in the visible range of the spectrum but transparent to the radiation used by the sensors 1 (infrared, radio waves, etc.).

Some of the sensors of the detection module 1 may be shared with other functional modules of the vehicle. For example, one or more of the infrared cameras may be used for example in the context of a detector of the level of alertness of the driver in order to avoid lapses of attention, or their falling asleep. One or more of the three-dimensional cameras may be used in the context of a gesture-detection interface.

A simple upscaling, for example of the viewing angle or of the resolution, may then render a camera from another functional module suitable for use according to the invention. It is then possible to make economies in terms of the cost and space of the addition of additional sensors.

A control unit 5 establishes a thermal profile for various parts of the body of the occupant or occupants U, on the basis of the images captured by the camera or cameras. Said thermal profile notably includes all the factors and parameters that influence the state and sensation of heat of the occupant or occupants U.

The control unit 5 in particular comprises a memory unit and calculation means for storing the images and parameters measured or estimated by the sensors and for establishing a thermal profile from these. This memory unit and the calculation means may notably be shared in the context of vehicle on-board electronics controlling other components of the vehicle, or else may be situated in a dedicated logic module.

The control unit 5 is connected to the heat control module 3. The heat control module 3 comprises for example a blower 7 which generates a flow of air. The heat management module 3 also comprises one or more conditioning devices 9, for example a heat exchanger or a resistive electrical element, via which the flow of air generated by the blower 7 passes.

The flow of conditioned air is then directed toward an air distribution device 11, comprising for example the vents 13, and one or more flaps upstream of the vents 13, and that distribute the air flow between said various vents 13.

The control unit 5 in particular controls the power of the blower 7, the power and/or a setpoint temperature of the conditioning device 9, and the air distribution device 11.

The control unit 5 in particular employs shape-recognition and edge-recognition algorithms to create, from the data coming from the detection module 1, a thermal profile $I_n$ and a collection of spatial coordinates $xyz_n$ for each of the parts of the body of the occupant or occupants U.

For example, the index $I_1$ may be associated with the head or the face. The coordinates $xyz_1$ then contain the position, within the vehicle interior space, of various notable points on the head of the occupant U (chin, crown, temples, etc.). The index $I_2$ may be associated with the neck, throat and shoulders region, and so on for the other indices.

The control unit 5 is configured in particular to detect, segment, and position the body of each occupant U in several parts, these in particular corresponding to various limbs of the occupant or occupants. A schematic outline of the human body is depicted in FIG. 2, which features an example of a breakdown using boxes in dotted line to enclose a portion of the body depicted. The breakdown depicted in particular makes a distinction between: the head; the neck with throat and shoulders; the torso; the abdomen; the left and right arms; the left and right hands; the left and right legs; the left and right feet.

Other body parts can be singled out, such as making a distinction between the nape of the neck and the rest of the neck, singling out the back, one or several digits, the face, portions of the face, etc.

Other, more complex, breakdowns may be employed, for example making a distinction between arms and forearms, calves and thighs, different parts of the head, etc. Conversely, by grouping nearby body parts together, a less complex breakdown is obtained, for example the trunk can be defined by grouping together the torso, the abdomen and the neck/shoulders region.

For each of the body parts, the control unit 5 captures data from the sensors of the detection module 1, such as the surface temperature or the dissipated heat flux (from the intensity of the far-infrared thermal radiation for example), the presence or absence of clothing covering that portion of the body, the presence and intensity of any solar radiation that may be incident on the body part, the proximity to an opening panel that is open, etc.

From these data, the control unit 5 establishes a plurality of thermal comfort indices $I_n$ each indicative of the thermal comfort felt at the level of one of the parts of the body of the occupant U, a low or zero absolute value of which indices indicates a high level of thermal comfort, whereas a high absolute value indicates discomfort.

The thermal comfort index $I_n$ also takes into account the temperature and the intensity of the flow of conditioned air distributed over the body part concerned.

In a similar way to that employed in the Fanger thermal model, said index $I_n$ may for example vary from −3 to +3, the value 0 indicating a situation of thermal equilibrium (taking into account the metabolic energy that is to be removed) in which a predetermined proportion of a sample of users feel a high level of thermal comfort in the body part concerned. The positive values (from 0 to +3) then represent situations of a sensation of warmth, the intensity of which increases with increasing divergence from the value 0. The negative values (from 0 to −3) represent situations of a sensation of cold, the intensity of which increases with increasing divergence from the value 0.

The control unit 5 will then regulate the operation of the heat control module 3 by taking the thermal comfort indices of the body parts into consideration to create around the occupant a thermal environment that minimizes a sum of the absolute values of the comfort indices $\Sigma|I_n|$.

In particular, this sum $\Sigma|I_n|$ may be compared against a threshold S. If $\Sigma|I_n| \leq S$ then no modification to the operation of the heat control device is initiated. If $\Sigma|I_n| \geq S$, the control unit will regulate the operation of the heat control device in order to reduce the sum $\Sigma|I_n|$.

The coordinates $xyz_n$ of the parts of the body of the occupant U may in particular serve to determine, or may directly contain, an estimate of the dimensions of the body part concerned (of index n). From said dimensions and tables stored in memory, the control unit 5 may then determine a morphological model of the occupant and consequently estimate the surface-area, the volume or the mass (and therefore the surface-area/volume ratio) of the body part concerned.

The tables may then contain models of the distribution of the density of vessels and of nerve endings in the various body parts. For example, it is known that the subcutaneous adipose mass contains few vessels and few nerves. The benefit of directing a flow of hot or cold air over a surface of the body that is covered with adipose mass is therefore limited, unlike, for example, the hands and, in particular, the digits. The hands and the digits have large surface areas for exchange of heat with the surrounding environment, while at the same time containing a great deal of vessels and nerves. Likewise, the back of an occupant, although the apparent surface area is great, contains few nerve endings.

Weighting coefficients $a_n$ are therefore associated with the thermal comfort index $I_n$ of each body part, and the control unit 5 will therefore adapt the operation of the heat control device to minimize the sum of the absolute values of the thermal comfort indices $I_n$ weighted by the associated weighting coefficient $a_n$: $\Sigma a_n |I_n|$.

FIG. 3 is a schematic flow diagram illustrating the associated heat control method 200.

The first step 201 is to capture images of the expected positions of the occupant or occupants U of the vehicle, for example the (driver and passenger) seats that may be occupied, using, in particular, near-infrared and far-infrared cameras. The images are then sent to the control unit 5. The parts of the body of the occupant U, particularly if these body parts are not covered with clothing, may notably be identified in the form of hotspots or hot zones using the far-infrared cameras.

The data emanating from other sensors of the detection module 1 are then also sent to the control unit 5.

The second step 203 is to create a three-dimensional and morphological model of the occupant or occupants, by segmenting the parts of their bodies on the images that are visible.

The third step 205 is to calculate the thermal comfort indices $I_n$ and morphological weighting coefficients $a_n$, if any, are also calculated from the data derived from the sensors and from the images from the infrared cameras.

For example, the thermal comfort indices $I_n$ can be calculated by measuring:

a surface temperature of the various body parts,
a temperature or temperatures of the vehicle interior in the area surrounding said body parts, and then by calculating the heat flux removed by each of the parts of the body of the occupant from the dimensions that have been estimated (possibly with the aforementioned tables) and the temperatures mentioned hereinabove.

The heat flux removed can also be calculated by evaluating the heat produced, supplied or absorbed in each part of the body as a result of metabolic activity and solar irradiation.

The thermal comfort indices $I_n$ for the various body parts are then calculated by comparing the calculated heat flux with a reference value corresponding to a situation of thermal comfort.

The sum $\Sigma a_n |I_n|$ of the absolute values of the thermal comfort indices $I_n$, possibly weighted by the associated morphological weighting coefficients $a_n$, is then compared against a threshold S.

If $\Sigma a_n |I_n| \leq S$, the control unit waits for a predetermined time interval dt and the method is repeated from the first step 201. As an alternative, the return to the first step 201 may occur when a sudden change in continuously-measured parameters is observed, for example if the occupant changes position (difference in images coming from the cameras) or if the vehicle exits a tunnel on a sunny day (increase in the brightness of the images coming from the cameras).

If $\Sigma|I_n| \geq S$, the control unit 5 in step 207 adapts the operation of the heat control module 3 according to predetermined procedures on the basis of the data coming from the sensors. The adapting of the operation of the heat control module 3 may notably involve adjusting parameters such as the temperature, the flow rate, the orientation and the shape of one or more of the conditioned air flows emitted into the vehicle interior by the vents 13.

The method 200 is then repeated from the first step 201 after the predetermined time interval dt or when a sudden change in measured parameters is detected.

In order to regulate the operation of the heat control module 3 and adapt the temperature or the flow rate of the air flow, the control unit 5 may in particular modify the operating power of the blower 7 and of the conditioning device 9, or else may switch the conditioning device from a cooling mode of operation (evaporator) to a heating mode of operation (resistive electrical elements).

FIG. 4 briefly illustrates a vent 13 of an air distribution device 11, produced in the form of a louvered grating or mobile fins.

The vent 13 in particular comprises a plurality of fins 15 aligned along their width. Said fins 15 serve, when the heat control module 3 is in operation, to deliver a laminar flow of conditioned air.

The fins 15 are able to rotate about an axis of rotation A with respect to a frame 17 that supports them. Rotating the fins 15 serves for example to change the direction of the air flow about a left-right horizontal axis (with respect to the direction of normal operation of the vehicle considered on a horizontal surface).

The frame 17 is able to move in pivoting about an axis of pivoting B perpendicular to the axis of rotation A and substantially parallel to the alignment of the fins 15. The pivoting of the frame 17 serves for example to change the direction of the air flow in an up-down vertical axis.

The control unit 5 may in particular be connected to electric motors that control the rotation of the fins 15 and the pivoting of the frame 17. In order to adapt the operation of the heat control device 3, the control unit 5 may then modify the direction of the air flow by actuating said electric motors, and thus concentrate the distribution of conditioned air onto those parts of the body of the occupants that are displaying a thermal comfort index of high absolute value, and therefore maximum discomfort. The aim is to minimize the sum of the absolute values.

By changing the alignment of the fins 15 (convergent or divergent), the shape of the air flow can also be modified (creating a convergent or divergent air flow).

In the case of a heat control module 3 that has a high number of vents 13, the control unit 5 may isolate those parts of the body of the occupant U for which the comfort index $I_n$ has a maximum absolute value, and concentrate the air flows of one or more vents 13 onto those body parts where the discomfort is at a maximum, notably by downgrading the quantity of air directed toward the other parts of the body of the occupant U.

According to another embodiment, the control unit 5 actuates the motors in order to cause the air flow to oscillate, for example in a circle, a polygon or an ovaloid, so that it passes in succession over different parts of the body of the occupant U. The control unit 5 may then slow the movement of the rotation-inducing and pivoting-inducing motors when the vents 13 are directed onto a body part for which the thermal comfort index $I_n$ has an absolute value that is high in relation to the other indices $I_n$ for the other body parts, so as to keep the conditioned air flow directed for longer onto said body part for which the level of discomfort is high.

Conversely, the control unit 5 may accelerate the movement of the rotation-inducing and pivoting-inducing motors when the vents 13 are directed onto a part of the body of the occupant U for which the thermal comfort index $I_n$ is sufficiently close to zero.

Alternatively, the control unit 5 may calculate a mean comfort index $I_0$ and compare the index $I_n$ for each body part against this mean index $I_0$. The control unit 5 may then redirect the flow for those body parts that have an index $I_n$ of absolute value lower than that of the mean index $I_0$ toward those parts of the body that have an index $I_n$ of absolute value higher than that of the mean index $I_0$.

With a view to economizing on energy, something which is particularly important in the case of an electric vehicle, the control unit 5 may be configured to execute a step of estimating the power required by the mode of operation of the heat control module 3, and an additional step of minimizing said total power may be incorporated into the step of regulating the heat control module 3.

For example, a term $P_{tot}$ that is positive and increasing with total power consumed may be added to the sum. This power term $P_{tot}$ may, in particular, be weighted by a weighting factor p the value of which is modified according to a setpoint modified by the occupant U, particularly by means of an interface that indicates a number of power levels.

The heat control method therefore anticipates minimizing the sum:

$$\Sigma a_n |I_n| + p P_{tot}$$

If the occupant selects a high setpoint power, for example by selecting a value 3 on an interface calibrated from 0 to 3 (0 corresponding to a system 100 that is switched off), the weighting factor p is low, or even zero, in value. The operation of the heat control device 3 can therefore be optimized by the control unit 5 with little or even no consideration as to power. The final air flow generated will on average have a high flow rate, with a temperature that will be higher or lower according to whether the heat control device is operating to extract heat or to provide heating.

Conversely, if the occupant selects a low power setpoint, for example by selecting a value 1, the weighting factor p has a high value: and the term $pP_{tot}$ therefore soon becomes predominant in the aforementioned sum. The operation of the heat control device 3 can therefore be optimized by the control unit 5 with significant consideration given to the total power. The final air flow generated will, on average, have a lower flow rate, with a temperature closer to that of the vehicle interior, particularly in comparison with the previous scenario (of low p).

Similarly, a step of reducing the noise generated by the heat control device 3 may be implemented, particularly by adding a term A that is positive and increasing with the noise generated by the mode of operation of the heat control device 3 in the sum that is to be minimized. This term A may once again be weighted by a coefficient a, the value of which can be modified in order to give preference either to quiet operation (where a is high) or high heat-control power (where a is low or zero).

The heat control method therefore anticipates minimizing the sum:

$$\Sigma a_n |I_n| + p P_{tot} + aA$$

or else, in order to optimize only the noise (with no consideration as to power):

$$\Sigma a_n |I_n| + aA$$

If the heat control device 3 also comprises a vehicle steering wheel heating device, its operating power is advantageously controlled by the control unit 5 according to the thermal comfort index $I_n$ for the hands or arms of the occupant U.

Likewise, if the heat control device also comprises a seat heating device, its power is controlled by the control unit 5 according to the thermal comfort index $I_n$ of at least part of the body of the occupant U, such as the back, the torso or the abdomen of the occupant U.

The heat control method and system 100 according to the invention allow the thermal comfort in the vehicle interior to be improved and customized. In particular, by allowing optimal distribution of the air flows in the vehicle interior, for a given thermal regulation power, the method according to the invention is able to offer the occupants an improved feeling with regard to warmth, while at the same time potentially improving the energy consumption, for the same feeling.

The device according to the invention, and, in particular, the detection module, contains a high number of sensors that are already present in vehicles, and used in the context of other functional modules such as modules that detect a lapse of attention, gesture-detection interfaces, modules that detect unrestrained occupants, etc. The additional cost resulting from the implementation of the device according to the invention is therefore limited.

The invention claimed is:

1. A heat control method for a heat control device for a vehicle interior, comprising:
   detecting, delimiting and positioning various parts of the body of an occupant;
   measuring thermal or physiological parameters regarding the various parts of the body of the occupant and/or the vehicle interior around the occupant;
   establishing a plurality of thermal comfort indices, each thermal comfort index corresponding to one of the parts of the body of the occupant taking into account a feeling of warmth or of cold in the associated body part, and of which the absolute value is at a minimum in a comfortable situation; and
   regulating the operation of a heat control device to minimize a sum of the absolute values of the comfort indices to create a regulated thermal environment around the occupant,
   wherein the heat control device comprises at least one vent of which the orientation over time is controlled so that a flow of air coming from the at least one vent describes oscillations passing in succession over various body parts of the occupant, and
   wherein the movement of the at least one vent is slowed around body parts for which the thermal comfort index has a high absolute value in comparison with other body parts of the occupant.

2. The method as claimed in claim 1, wherein, in the sum of the absolute values of the comfort indices, the comfort index for each body part is weighted by a morphological weighting coefficient that takes account of at least one of the following parameters: the total surface-area of the body part, the total volume of the body part, the surface-area/volume ratio of the body part, the vessel density of the body part, the nerve density of the body part.

3. The method as claimed in claim 1, further comprising:
   isolating those body parts for which the thermal comfort index indicates maximum discomfort; and
   regulating the distribution of conditioned air so as to concentrate the flow or flows of conditioned air onto those body parts experiencing the maximum discomfort while reducing the portion of the air flow or flows directed toward the other body parts.

4. The method as claimed in claim 1, wherein the sum of the thermal comfort indices also contains an energy weighting term, that is positive and increasing with total power consumed in order to create the regulated thermal environment around the occupant.

5. The method as claimed in claim 1, wherein the sum of the thermal comfort indices also contains an acoustic weighting term, that is positive and increasing with the acoustic noise generated in creating the regulated thermal environment around the occupant.

6. The method as claimed in claim 1, wherein the thermal or physiological parameters for the various parts of the body of the occupant and/or of the vehicle interior include one or more of the following parameters: a surface temperature of at least one of the parts of the body of the occupant, a temperature of the vehicle interior, the presence or absence of clothing over a part of the body of the occupant, the heat dissipated by a part of the body of the occupant.

7. The method as claimed in claim 1, wherein estimating a thermal or physiological parameter comprises:
   capturing images of the vehicle interior at the expected positions for the parts of the body of the occupant, using far-infrared cameras,
   delimiting and positioning, within the captured images, hotspots corresponding to parts of the body of the occupant, and
   wherein regulating the thermal-conditioning device comprises concentrating the flow or flows of conditioned air onto the hotspots detected.

8. The heat control method as claimed in claim 1, further comprising:
   measuring or estimating the heat produced or supplied by the metabolic activity in the various body parts, and which will be exchanged with the external environment, as well as any heat that might be absorbed from solar radiation;
   measuring or estimating the level of clothing coverage of the various body parts and the thermal resistance associated with this clothing on each part of the body;
   estimating the dimensions of the various parts of the body of the occupant, and estimating the surface area for exchange of heat with the environment of each of the parts of the body of the occupant from correlations, tables and from the estimated dimensions;
   estimating a surface temperature of the various parts of the body of the occupant, by direct measurement or combining the estimates of the heat produced, supplied or absorbed on each part of the body, as well as the level of coverage and the thermal resistance of the associated clothing;
   measuring or estimating a temperature and speed of the air in the vehicle interior in the vicinity of each body part;
   measuring or estimating the radiative impact of the surfaces of the vehicle interior facing each body part;
   calculating the heat flux that can be exchanged at a comfortable temperature on each of the body parts on the basis of the various preceding factors; and
   calculating the thermal comfort indices for the body parts on the basis of the discrepancy between the heat flux that can be exchanged at a reference comfortable temperature on each of said body parts and the heat flux produced, supplied or absorbed on each body part.

9. A heat control system for a motor vehicle interior, comprising:
   a heat control device, comprising:
   at least one vent of which the orientation over time is controllable so that a flow of air coming from the at least one vent describes oscillations passing in succession over various parts of the body of an occupant;
   at least one camera, capturing images of the motor vehicle interior space in which the body of the occupant is expected;
   at least one sensor sensing one or more thermal or physiological parameters of one or more parts of the body of the occupant, relating to a state of thermal comfort of said occupant; and a control unit configured to:
- delimit and position the various parts of the body of the occupant in the vehicle interior from the images captured by the camera,
- establish a plurality of thermal comfort indices, each thermal comfort index corresponding to one of the body parts of the occupant taking into account a feeling of warmth or of cold in the associated body part, and of which the absolute value is at a minimum in a comfortable situation, and
- regulate the operation of a heat control device to minimize a sum of the absolute values of the comfort indices to create a regulated thermal environment around the occupant, wherein the movement of the at least one vent is slowed around body parts for which the thermal comfort index has a high absolute value in comparison with other body parts of the occupant.

10. A heat control method for a heat control device for a vehicle interior, comprising:
- detecting, delimiting and positioning various parts of the body of an occupant;
- measuring thermal or physiological parameters regarding the various parts of the body of the occupant and/or the vehicle interior around the occupant;
- establishing a plurality of thermal comfort indices, each thermal comfort index corresponding to one of the parts of the body of the occupant taking into account a feeling of warmth or of cold in the associated body part, and of which the absolute value is at a minimum in a comfortable situation; and
- regulating the operation of a heat control device to minimize a sum of the absolute values of the comfort indices to create a regulated thermal environment around the occupant, wherein the sum of the thermal comfort indices also contains an acoustic weighting term, that is positive and increasing with the acoustic noise generated in creating the regulated thermal environment around the occupant.

* * * * *